(12) United States Patent
Sünwoldt et al.

(10) Patent No.: US 7,114,405 B2
(45) Date of Patent: Oct. 3, 2006

(54) PROBE MOUNTING DEVICE FOR A SCANNING PROBE MICROSCOPE

(75) Inventors: Olaf Sünwoldt, Berlin (DE); Heiko Haschke, Rostock (DE)

(73) Assignee: JPK Instruments AG, Berlin (DE)

( * ) Notice: Subject to any disclaimer, the term of this patent is extended or adjusted under 35 U.S.C. 154(b) by 193 days.

(21) Appl. No.: 10/490,441

(22) PCT Filed: Sep. 24, 2002

(86) PCT No.: PCT/DE02/03689

§ 371 (c)(1),
(2), (4) Date: Sep. 21, 2004

(87) PCT Pub. No.: WO03/028036

PCT Pub. Date: Apr. 3, 2003

(65) Prior Publication Data

US 2005/0017150 A1   Jan. 27, 2005

(30) Foreign Application Priority Data

Sep. 24, 2001   (DE) ............................... 101 48 322

(51) Int. Cl.
*G01D 21/00* (2006.01)
(52) U.S. Cl. ..................... 73/866.5; 248/500
(58) Field of Classification Search ............... 73/866.5; 248/500
See application file for complete search history.

(56) References Cited

U.S. PATENT DOCUMENTS

| | | | |
|---|---|---|---|
| 4,374,327 A * | 2/1983 | Christov ................ 250/442.11 |
| 5,260,824 A * | 11/1993 | Okada et al. ................ 359/368 |
| 5,455,420 A * | 10/1995 | Ho et al. ..................... 250/306 |
| 5,510,615 A * | 4/1996 | Ho et al. ..................... 250/306 |
| 5,804,710 A | 9/1998 | Mamin et al. |
| 6,176,122 B1 | 1/2001 | Shimizu et al. |
| 6,310,342 B1 | 10/2001 | Braunstein et al. |
| 6,677,567 B1 * | 1/2004 | Hong et al. ............... 250/201.3 |
| 6,744,268 B1 * | 6/2004 | Hollman ..................... 324/758 |
| 6,910,368 B1 * | 6/2005 | Ray ............................ 73/105 |
| 6,945,100 B1 * | 9/2005 | Kwon et al. .................. 73/105 |
| 6,951,129 B1 * | 10/2005 | Kwon et al. .................. 73/105 |
| 2004/0140424 A1* | 7/2004 | Kwon et al. ................ 250/234 |

FOREIGN PATENT DOCUMENTS

WO    WO 02 071412 A    9/2002

\* cited by examiner

*Primary Examiner*—Hezron Williams
*Assistant Examiner*—Rodney Frank
(74) *Attorney, Agent, or Firm*—Smith Patent Office

(57) ABSTRACT

The invention relates to a probe (207) mounting device for a scanning probe microscope, especially a scanning force microscope, comprising a retaining member (200) for installation in a measuring assembly of a scanning probe microscope. The probe (207) is detachably mounted on the retaining member (200) by means of a clamping member (201), the clamping member being secured in self-locking fashion to the retaining member (200).

16 Claims, 3 Drawing Sheets

PROBE MOUNTING DEVICE FOR A SCANNING PROBE MICROSCOPE

The invention relates to a probe mounting device for a scanning probe microscope, especially a scanning force microscope, comprising a retaining member for installation in a measuring assembly of a scanning probe microscope.

Scanning probe microscopy is an examination technique which allows non-destructive characterization of surfaces of a specimen. Scanning probe microscopy, for example, serves for high-resolution determination of the topography of the surface under examination. Furthermore, scanning probe microscopy permits other properties of surfaces to be determined, such as the force of adhesion or elasticity. The category of scanning probe microscopes, among others, also includes scanning near field optical microscopes or scanning tunneling electron microscopes.

The mounting of probes utilized for examining a specimen is of decisive significance for the operation of a scanning probe microscope. In any scanning probe microscope, the probe must be secured in such a way that a respective measured physical variable can be detected in dependence upon a distance between the specimen and a measuring tip of the probe. In this context the mounting of the probe must assure that the variable measured by the scanning probe microscope can be detected in a direction perpendicular to the surface of the specimen with a resolution in the sub-Angström range and with at least nanometer resolution in a plane of the specimen surface, for both of which it is required that the probe mounting disposes of sufficient mechanical stability.

One type of scanning probe microscopy is scanning force microscopy with which a spring pole is used as the probe, normally referred to as a cantilever. There is a measuring tip at one end of the cantilever. The probe (cantilever) preferably consists of silicon, but other materials may be used as well, such as silicon nitride or diamond. As a rule, the cantilever, including its measuring tip, is mounted on a substrat, sometimes referred to as base. In mounting the probe of a scanning force microscope, normally, the base serves for the probe to be fastened. For purposes of simplification, however, fastening of the probe will be the expression used below.

Modern scanning probe microscopes allow operation of the microscope also when the specimen to be examined is surrounded by a fluid, such as air or liquid. Moreover, scanning probe microscopes dispose of various types of measurement, like static measurements or dynamic measurements. Adequate mounting of the probe must meet the corresponding diverse requirements as well.

Two kinds of mounting the probe in a scanning probe microscope are known in the art. With one of them, the probe is either attached by gluing or retained by means of a liquid which has adhesive properties. The second type of known mounting is fully mechanical, usually implemented by means of a spring. Fastening of the probe by means of an adhesive is unsuitable for many scanning probe microscopes since the most frequently applied adhesive materials produce a long lasting bond between the probe and a retaining member to which the probe is to be fixed, a bond which can be severed only by taking recourse to solvents. Besides, the use of adhesive materials is very critical for operating scanning probe microscopes in liquids because the liquid within which the probe is located may undergo chemical changes caused by interaction with the adhesive material. For this reason, mechanical fastening by means of some spring retention often is selected. With this choice, adequate tensional force is given for fixing the probe, and the measuring experiments normally are not influenced. In known apparatus the spring used to provide clamping attachment of the probe at the retaining member is secured by a screwed connection. In other known apparatus a wire is passed through a passage in the retaining member to the place of the probe, and the spring force needed is provided at the other side of this passage.

It is the object of the invention to indicate an improved device for retaining a measuring probe for a scanning probe microscope, especially a scanning force microscope, that can be produced at low cost and enable the probe to be mounted and detached with but little expenditure.

The object is met, in accordance with the invention, in a probe mounting device for a scanning probe microscope according to the preamble of claim 1, in that a probe is detachably mounted on the retaining member by means of a clamping member, the clamping member being secured in self-locking fashion to the retaining member.

An essential advantage achieved by the invention over prior art is to be seen in the self-locking of the clamping member as this eliminates the need for additional means to secure the clamping member to the retaining member. The screwed connections of the prior art thus are dispensed with.

It is likewise advantageous that the retaining member may consist of materials with which the thread, needed for the known screwed connection, could be provided with great difficulty only or not at all. As no screwed connection is present materials may be employed for producing the retaining member which are unsuited or not useful at all for making the screwed connection.

According to a convenient further development of the invention the clamping member is mounted for detachment on the retaining member, whereby removing the clamping member from the retaining member, e.g. for cleaning purposes or replacement is facilitated.

Elastic tensional force for keeping the probe on the retaining member is obtained, in a convenient modification of the invention, in that the clamping member is embodied by a spring member. Using a spring member offers the additional advantage that the self-locking of the clamping member on the retaining member is facilitated as it is made easy with the help of the spring tension of the spring member.

With another advantageous embodiment of the invention, the device including the retaining member and the probe fastened to the same is adaptable to different measurement tasks because the retaining member is provided with a coating. In this manner, in particular a chemical reaction can be avoided between the clamping member and a fluid in which the specimen is located when scanning probe microscopy is performed.

The self-locking feature of the clamping member on the retaining member may be implemented by simple mechanical means in accordance with a convenient further development of the invention, namely by realizing the self-locking of the clamping member in a recess formed in the retaining member.

With a preferred modification of the invention, a mounting portion of the probe may be disposed at least partly in another recess formed in the retaining member. Hereby a space-saving, mechanically stable mounting of the probe on the retaining member is achieved.

A preferred further development of the invention may provide for the probe to be held by means of the clamping member in the area of a bottom surface of the retaining member at an inclination with respect to the bottom surface so that a measuring tip of the probe protrudes from the bottom surface. In this manner it can be assured that the measuring tip defines the lowest point of the measuring assembly of the scanning probe microscope.

In an embodiment of the invention it may be provided conveniently that the clamping member is fixed to the retaining member in the area of the bottom surface. That permits a clamping member of minimized dimensions to be used for fastening the probe to the retaining member.

A preferred modification of the invention provides for the clamping member to be mounted in an area of the retaining member that is separated from another area of the clamping member by means of a fluid-tight seal. When examining a specimen in a fluid the two areas of the clamping member are separated from each other by the fluid-tight seal, one area of the retaining member then being covered at least partly by the fluid. When installing the clamping member in this area of the clamping member it is not necessary to pass the clamping member through the fluid-tight seal so that the sealing problems known in the art are avoided. When fluid exits the measuring area where the probe is located difficulties may be encountered because shortcircuiting could occur due to the electrical connections in the area of the measuring assembly. Such shortcircuits present risks both to the scanning probe microscope and the users thereof. Besides, a clamping member formed through the fluid-tight seal would be difficult to exchange. Passing the clamping member through a seal, such as sometimes provided in the art, makes the whole structure more complicated and production thereof more expensive. In connection with this further development suggested by the invention an additional advantage is gained in that the amount of fluid can be minimized which surrounds the specimen during the examination.

A preferred embodiment of the invention provides for the clamping member to be fastened at a side surface of the retaining member. That permits good separation in space between the clamping member and the probe, especially the measuring tip of the probe.

In a further development of the invention it may be conveniently provided that the retaining member comprises a light passage portion made of transparent material so that light rays may pass through the light passage portion to the probe or from the probe through the light passage portion. The light rays passing through the light passage portion, for example, may be measuring light rays which must get from the scanning probe microscope, in which the light spot principle is applied, to the probe. But the light passage portion likewise may be utilized for illuminating the specimen with condenser light. Thus it is possible to observe the specimen with an optical microscope in addition to subjecting it to the scanning probe microscopic examination. Moreover, light from the specimen may pass through the light passage portion to be used for examining the specimen with the aid of a vertical illumination microscope.

Optimized passage of light through the light passage portion is achieved by an advantageous further development of the invention with which an upper end face and a lower end face of the light passage portion both are polished.

Suitable transparent materials to be used for the light passage portion of the retaining member, for example, are glass or plexiglass, whereby cost-effective production of the retaining member can be promoted. Moreover, these materials likewise may be used in connection with various fluids without giving rise to any disadvantageous chemical reactions between the fluid above the specimen and the glass or plexiglass.

To permit dynamic examination processes to be applied with the aid of the scanning probe microscope, a modification of the invention may provide for a coil and/or a piezo structural element to be disposed on the retaining member. In dynamic examination processes the probe oscillates. Magnetic excitation of the probe may be obtained by means of a coil. When the piezo element oscillates the probe is excited so as to oscillate as well. This effect may be utilized to achieve a better signal-to-noise ratio, e.g. by way of the so-called "Loch-In-Technique". With these probes, moreover, for instance lateral forces are avoided or at least reduced during imaging. Excitation of a magnetic probe by means of a coil offers substantially the same advantages.

A modification of the invention may advantageously provide for a fastening member to be disposed at the retaining member. The fastening member may be used for mechanically coupling the retaining member to the remainder of the measuring assembly of the scanning probe microscope, the fastening member serving to accommodate mechanical forces while being installed on the remainder of the measuring assembly. In this manner the retaining member is protected against unintentional destruction during the fastening procedure, for example, if the retaining member is made entirely of glass or plexiglass, a material which may be preferred if optimized illumination of the specimen is provided.

The invention will be described further, by way of example, with reference to a drawing, in which.

Figure 1:
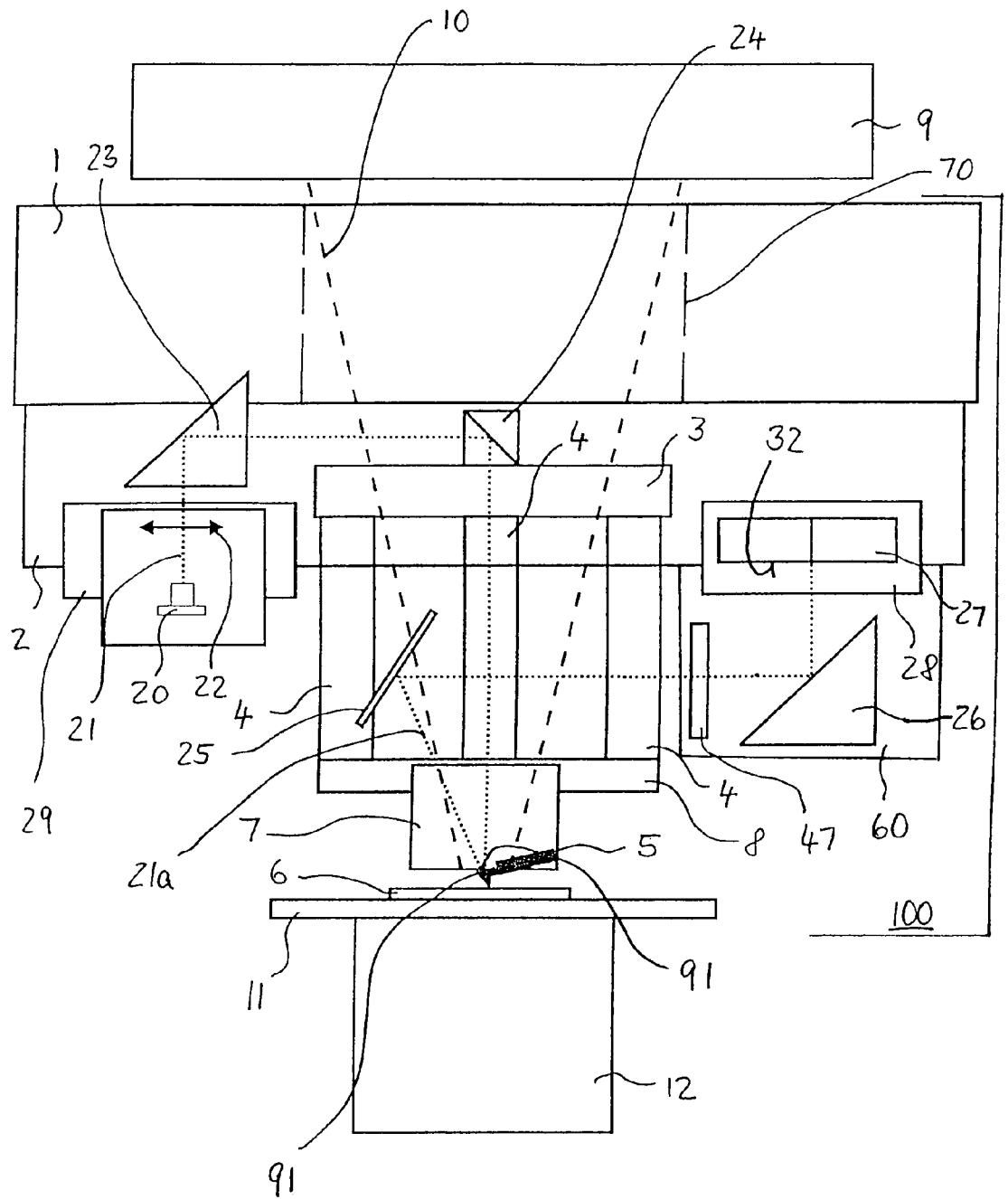
FIG. 1 is a diagrammatic illustration of a measuring assembly for a scanning probe microscope.

FIG. 1 diagrammatically shows a measuring assembly 100 for a scanning probe microscope, especially a scanning force microscope, comprising a lateral shifting unit 1 which permits precise movement of the other structural members connected to the lateral shifting unit 1 in a plane extending vertically to the plane of the drawing in FIG. 1. The lateral shifting unit 1 may be composed, for example, of piezoelectric elements. In principle, however, any desired kind of apparatus may be used as long as they permit accurate displacement in a plane. A frame member 2 is mounted on the lateral shifting unit. Further structural members of the arrangement shown in FIG. 1 for a scanning probe microscope are fastened to the frame member 2 in a way so as to be movable in lateral direction with the aid of the lateral shifting unit 1.

A glass plate 3 is retained on the frame member 2. Alternatively it may be a plate of non-transparent material, especially aluminum, comprising a glass window. A plurality of vertical shifting units 4, preferably embodied by piezoelectric structural elements are mounted on the glass plate 3. The vertical shifting units 4 are arranged so as not to extend into the condenser light path 10, at least not so as to disturb it. Nevertheless the vertical shifting units 4 are placed as closely as possible to the condenser light path 10 so as to offer a high degree of stability.

Precise positioning of a probe 5 provided to carry out the scanning probe microscopic examinations, embodied by a so-called cantilever in the case of a scanning probe microscope, is accomplished in vertical direction, perpendicular to the lateral shifting plane, by the vertical shifting unit 4. This is required for adjusting and measuring the distance between the probe 5 and a specimen 6 with a high degree of precision. The probe 5 is mounted on a glass body 7 which in turn is coupled by an annular member 8 to the plurality of lateral shifting units 4. A defined transition from air to water must be given in order to render the measuring assembly 100 suitable also for applications under liquids. This is enabled by the glass body 7 which is dimensioned so as not to obstruct the condenser light path 10. The glass body 7 preferably is formed with a groove to permit the probe 5 to be installed at an inclination with respect to the plane of the specimen.

Condenser lighting 9 is provided above the measuring assembly 100 and above the lateral shifting unit 1 to generate condenser light. In FIG. 1, a condenser light path 10 has a conical configuration, as depicted in dashed lines. The condenser light path 10 extends substantially centrally through the lateral shifting unit 1, formed for this purpose with an opening 70, further through the glass plate 3, the annular member 8, and the glass body 7, thus illuminating the specimen 6 placed on a specimen support 11. The specimen support 11 may be a commercially available microscope slide or a Petri dish. The condenser lighting 9 serves for examining the specimen 6 with the aid of an objective 12 which is disposed underneath the specimen support 11.

The embodiment of the measuring assembly 100 illustrated in FIG. 1 for a scanning probe microscope thus permits the specimen 6 to be illuminated with condenser light even if the specimen 6 is disposed on the specimen support 11 for a scanning probe microscopic examination. The condenser light may spread in typical manner, for instance, conically along the condenser light path 10. To avoid any obstruction of the spreading of condenser light, those components of the arrangement according to FIG. 1 which are disposed in the range of the condenser light path 10 are provided, for example, with openings through which the condenser light may pass, or they are made of a material which is transparent to light, such as the glass plate 3 and the glass body 7. Deflection of the condenser light by means of additional optical elements on the way from the condenser lighting 9 to the specimen 6 is not required. Such optical deflections, as a rule, lead to reduced quality of the illumination of the specimen 6 for optical microscopic examination through the objective 12.

The specimen 6 may be subjected to a scanning probe microscopic examination by means of the measuring assembly 100 illustrated in FIG. 1. To that end, a light source 20, preferably embodied by a laser light source, generates measuring light rays 21 which are directed through a focussing lens 22, a prism 23, and a beam splitter 24 onto the probe 5. The size of the beam splitter 24 and its spacing from the specimen 6 are so selected that phase rings of the light from the condenser lighting 9, enabling the phase contrast, either pass by the beam splitter 24 on the outside or entirely through the beam splitter 24. The holder (i.e. the glass plate 3) of the beam splitter 24 is made of glass or another transparent material to let the light from the condenser lighting 9 pass completely undisturbed past the beam splitter 24. A different kind of retention might be provided, such as by a metal frame, but it would cause considerable disturbance of the condenser light path 10.

In accordance with the light spot principle, the measuring light rays 21 which are incident on the probe 5 are reflected, and the reflected measuring light rays 21a are guided via a deflection mirror 25 and another prism 26 to a photodiode 27. The photodiode 27 conveniently comprises a detector surface 32 having two segments. The distribution of the reflected measuring light rays 21a between the two segments of the detector surface of the photodiode 27 varies in response to the bending of the probe 5. The signals generated in the area of the two segments are a measure of the bending of the probe 5. The bending of the probe 5 in turn is the consequence of the interaction between the probe 5 and the specimen 6. This is the usual light spot measuring principle which is applied with scanning probe microscopes, especially scanning force microscopes and, therefore, will not described in greater detail here.

The photodiode 27 is mounted on the frame member 2 by means of an adjustment unit 28. The light source 20 and the focussing lens 22 are mounted similarly on the frame member 2 by means of another adjustment unit 29. The other prism 26 and a correction lens 47 which serves to correct distortions of measured values upon relative movement of the reflection member 90 with respect to other members of the light spot feature, especially the photodiode 27, prism 23, beam splitter 24, deflection mirror 25, correction lens 47, the other prism 26, as well as the light source 20, are mounted on the frame member 2 by means of a fastening member 60.

Figure 2:
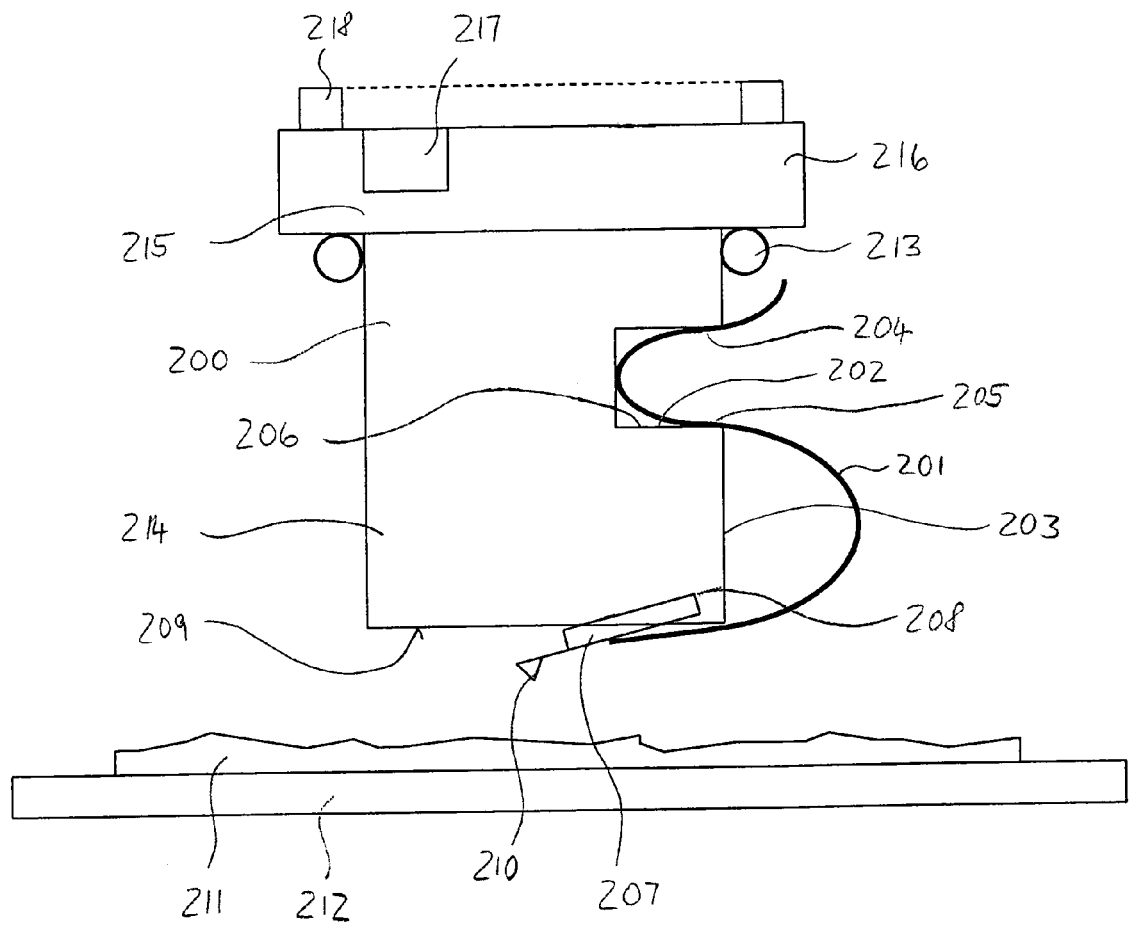
FIG. 2 shows a retaining member for retaining a probe.

FIG. 2 shows a retaining member 200 to which a clamping member 201 is fastened in self-locking fashion in a recess 202 in the area of a side surface 203. The clamping member 201 designed as a spring is kept in the recess 202 due to elastic force by which portions 204, 205 of the clamping member 201 are pressed against an inner wall 206 of the recess 202. In the measuring assembly 100 according to FIG. 1 the retaining member can take over the function of the glass body 7, as regards securing the probe 5.

A probe 207 is arranged in another recess 208. The other recess 208 is formed in the area of a bottom surface 209 of the retaining member 200. The other recess 208, for example, is a groove. The probe 207 is held in the other recess 208 by means of the clamping member 201, the other recess 208 being designed such that the probe 207 is inclined with respect to the bottom surface 209. As a result, the measuring tip 210 of the probe 207 protrudes from the bottom surface 209 of the retaining member 200 and can be used for examining a specimen 211 on a specimen support 212. Without the inclination, it would have to be made sure that the measuring tip 210 is longer than the thickness of the clamping member 201 in the recess 202.

A fluid-tight seal 213 which may be an O-ring of suitable material, such as teflon, is formed in an area above the clamping member 201.

The fluid-tight seal 213 divides the retaining member 200 into a lower portion 214 and an upper portion 215. When the specimen 211 is being examined in a liquid the fluid-tight seal closes off an area in which the fluid covers the specimen 211, substantially comprising the surface of the lower portion 214, from the area of the upper portion 215.

A fastening member 216 is disposed on the retaining member 200 and utilized to fasten the retaining member 200 in the measuring assembly of the scanning probe microscope (see FIG. 1). In the embodiment shown, the fastening member 216 is of annular configuration so that it surrounds and secures the retaining member 200 in the area of the upper portion 215. A piezoceramic solid-state body element 217 is mounted on the fastening member 216. Also a coil 218 is mounted on the fastening member 216. The coil 218 and the piezoceramic solid-state body element 217 serve to cause the measuring tip 210 to oscillate so that dynamic examination processes of scanning probe microscopy may be performed by means of the scanning probe microscope which comprises the arrangement illustrated in FIG. 2.

In a preferred embodiment the retaining member 200 and the fastening member 216 are made in one piece, e.g. of glass.

Figure 3:
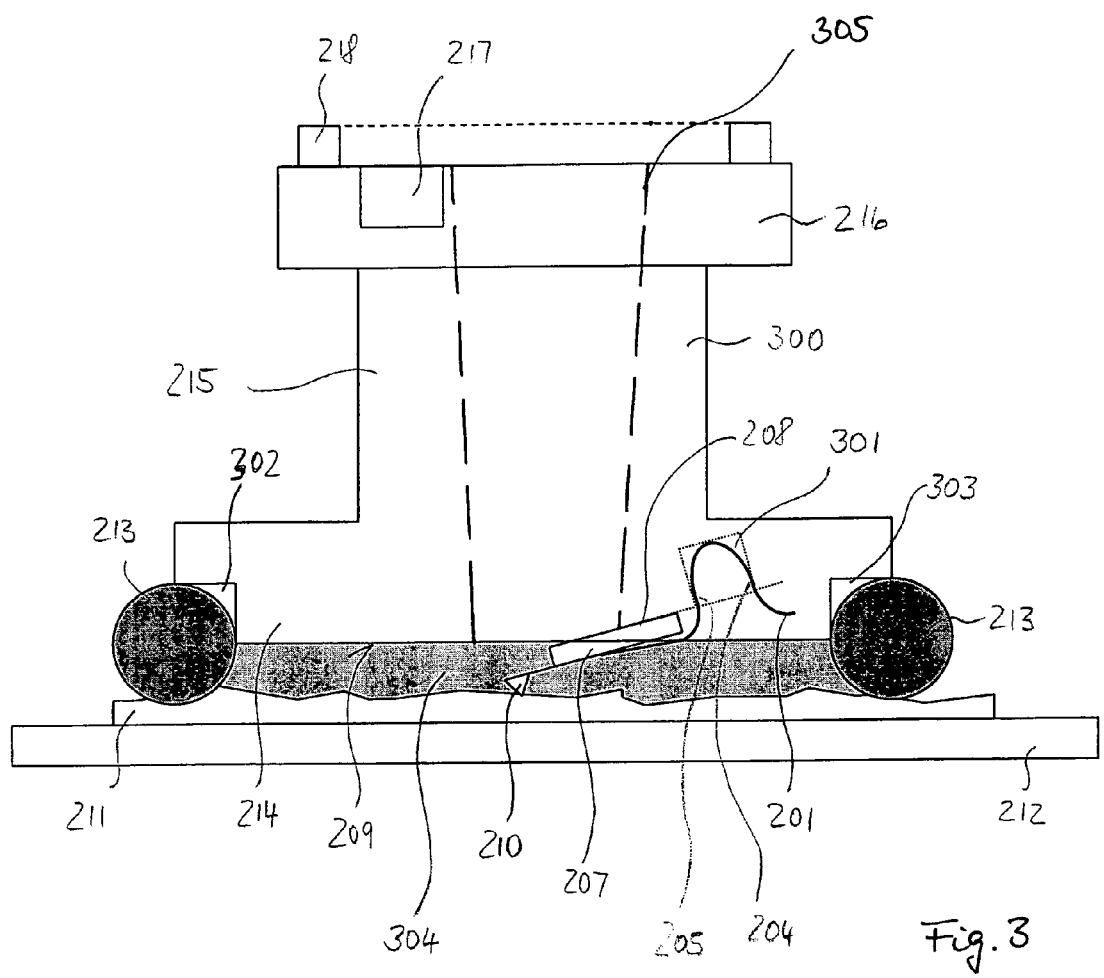
FIG. 3 shows another retaining member for retaining a probe.

FIG. 3 shows an arrangement including another retaining member 300. In connection with FIG. 3 like features will be referred to by the same reference numerals as in FIG. 2. The other retaining member has a recess 301 in the area of the bottom surface 209 of the other retaining member 300. The clamping member 201 is retained in self-locking fashion in the recess 301, in the same way as described with reference to FIG. 2. The probe 207 is held in the other recess 208 by the clamping member 201 which is embodied by a spring in the embodiment illustrated in FIG. 3. Thus the measuring tip 210 again protrudes from the bottom surface 209, and the probe 207 is inclined.

Other than with the embodiment shown in FIG. 2, the fluid-tight seal 213 of the embodiment according to FIG. 3 is arranged in corner zones 302, 303 of the other retaining member 300 directly adjacent to the bottom surface 209 of the other retaining member 300. In this way the amount of fluid 304 required for the examination of the specimen 211 can be minimized. As with the embodiment of FIG. 2, a fastening member 216 is mounted on the other retaining member 300, and a piezoceramic solid-state body element 217 as well as a coil 218 are disposed on the fastening member.

The retaining member 200 and the retaining member 300 may consist totally or partly of a material which is transparent to light, thus fulfilling the function of the glass body 7 in the measuring assembly 100 shown in FIG. 1. When made partly of transparent material, a light passage portion 305 is formed of which FIG. 3 illustrates an example. The material, for instance, is glass or plexiglass. By virtue of the at least partially transparent design of the retaining member 200 and the other retaining member 300, scanning probe microscopic examinations may be performed both in air and liquid without having to modify the measuring assembly. In comparison with the prior art, therefore, separate liquid cells are eliminated which normally are very expensive.

Removal of the probe, such as for replacement or cleaning of the probe 202, is facilitated by having the probe 202 fastened with the help of the self-locking clamping member 201. The self-locking permits ready mounting and removal of the clamping member 201 on the retaining member 200 or the other retaining member 300. In the case of the embodiments illustrated in FIGS. 2 and 3, the clamping member 201 may be dismantled readily from the retaining member 200 or the other retaining member 300 by lightly pressing together the two portions 204, 205 of the clamping member 201 against the spring tension of the clamping member 201.

Positioning the clamping member 201 in the lower area 214 of the clamping member allows a design of the measuring assembly for a scanning probe microscope which does not require the clamping member to be passed through the fluid-tight seal 213, whereby the frequent sealing problems of known devices are mitigated or prevented altogether.

Use of the arrangements according to FIGS. 2 and 3 in combination with various fluids is rendered possible by coating the clamping member 201 with a layer of material that does not react chemically with the respective fluid. For example, a steel clamping spring may be provided with gold plating. Depending on the respective application, a polytetrafluoroethylene (PTFE) coat likewise may be applied.

The features of the invention disclosed in the specification above, in the claims and drawing may be significant for implementing the invention in its various embodiments, both individually and in any combination.

What is claimed is:

1. A probe mounting device for a scanning probe microscope, especially a scanning force microscope, comprising a retaining member for installation in a measuring assembly of a scanning probe microscope, characterized in that a probe is detachably mounted on the retaining member by means of a clamping member, the clamping member being secured in self-locking fashion to the retaining member.

2. The device as claimed in claim 1, wherein the clamping member is detachably mounted on the retaining member.

3. The device as claimed in claim 1, wherein the clamping member is a spring member.

4. The device as claimed in claim 1, wherein the clamping member comprises a coating.

5. The device as claimed in claim 1, wherein the self-locking of the clamping member is realized in a recess formed in the retaining member.

6. The device as claimed in claim 1, wherein a mounting portion of the probe is disposed at least partly in another recess formed in the retaining member.

7. The device as claimed in claim 1, wherein the probe is held by means of the clamping member in the area of a bottom surface of the retaining member and at an inclination with respect to the bottom surface so that a measuring tip of the probe protrudes from the bottom surface.

8. The device as claimed in claim 7, wherein the clamping member is fixed to the retaining member in the area of the bottom surface.

9. The device as claimed in clam 1, wherein the clamping member is mounted in an area of the retaining member which area is separated from another area of the clamping member by a fluid-tight seal.

10. The device as claimed in claim 1, wherein the clamping member is fastened at a side surface of the retaining member.

11. The device as claimed in claim 1, wherein the retaining member comprises a light passage portion of transparent material so that light rays may pass through the light passage portion to the probe or from the probe through the light passage portion.

12. The device as claimed in claim 11, wherein upper and lower end faces of the light passage portion are polished.

13. The device as claimed in claim 11, wherein at least the light passage portion is made of glass or plexiglass.

14. The device as claimed in claim 1, wherein a coil is disposed on the retaining member.

15. The device as claimed in claim 1, wherein a piezo structural element is disposed on the retaining member.

16. The device as claimed in claim 1, wherein a fastening member is disposed on the retaining member.

* * * * *